Sept. 2, 1941.  G. C. KOHL ET AL  2,254,295

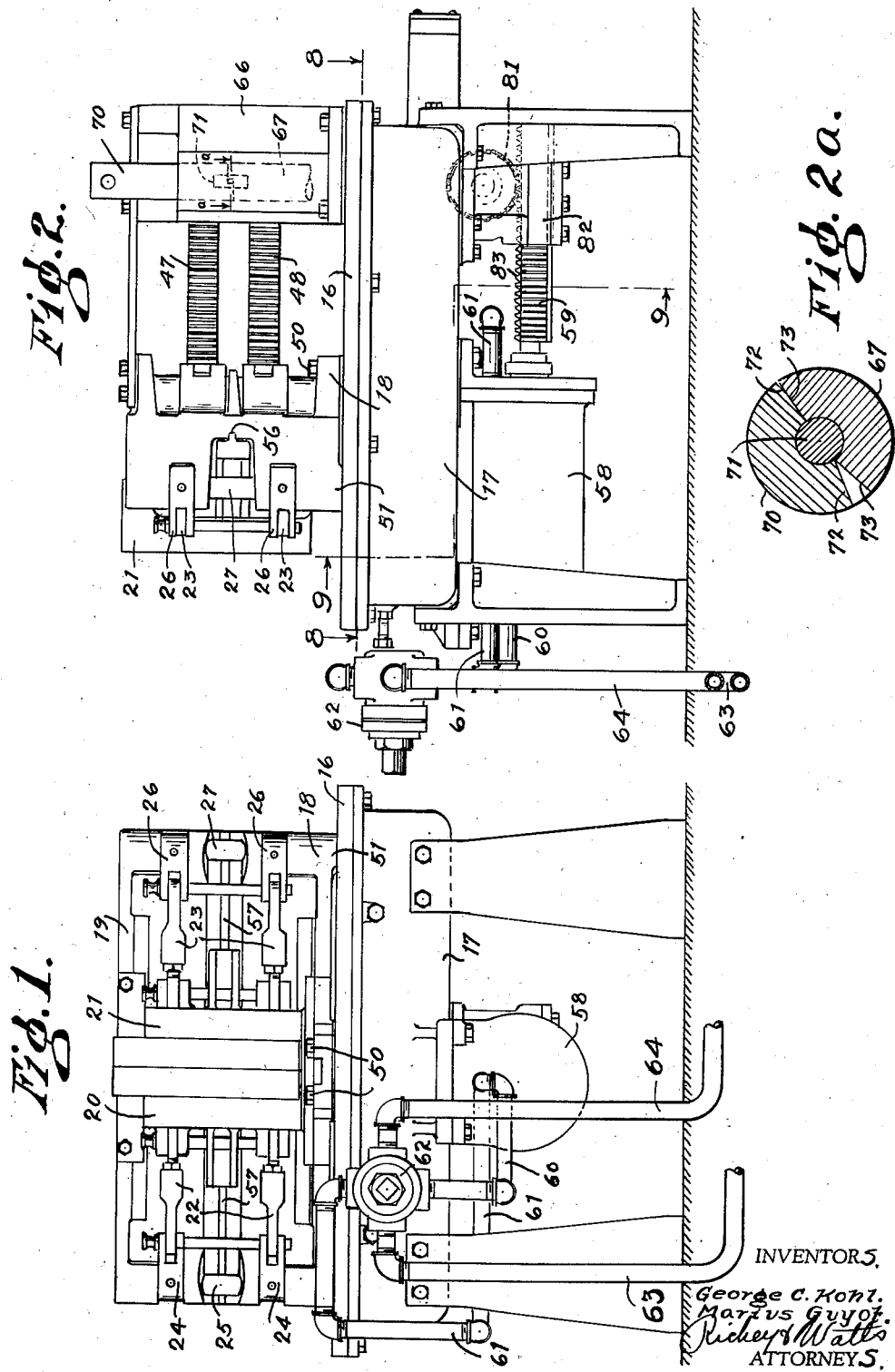

MOLD

Filed Dec. 17, 1938  10 Sheets-Sheet 2

INVENTORS
George C. Kohl.
Marius Guyot.
BY Richey & Watts
ATTORNEYS

Sept. 2, 1941.  G. C. KOHL ET AL  2,254,295
MOLD
Filed Dec. 17, 1938  10 Sheets-Sheet 3
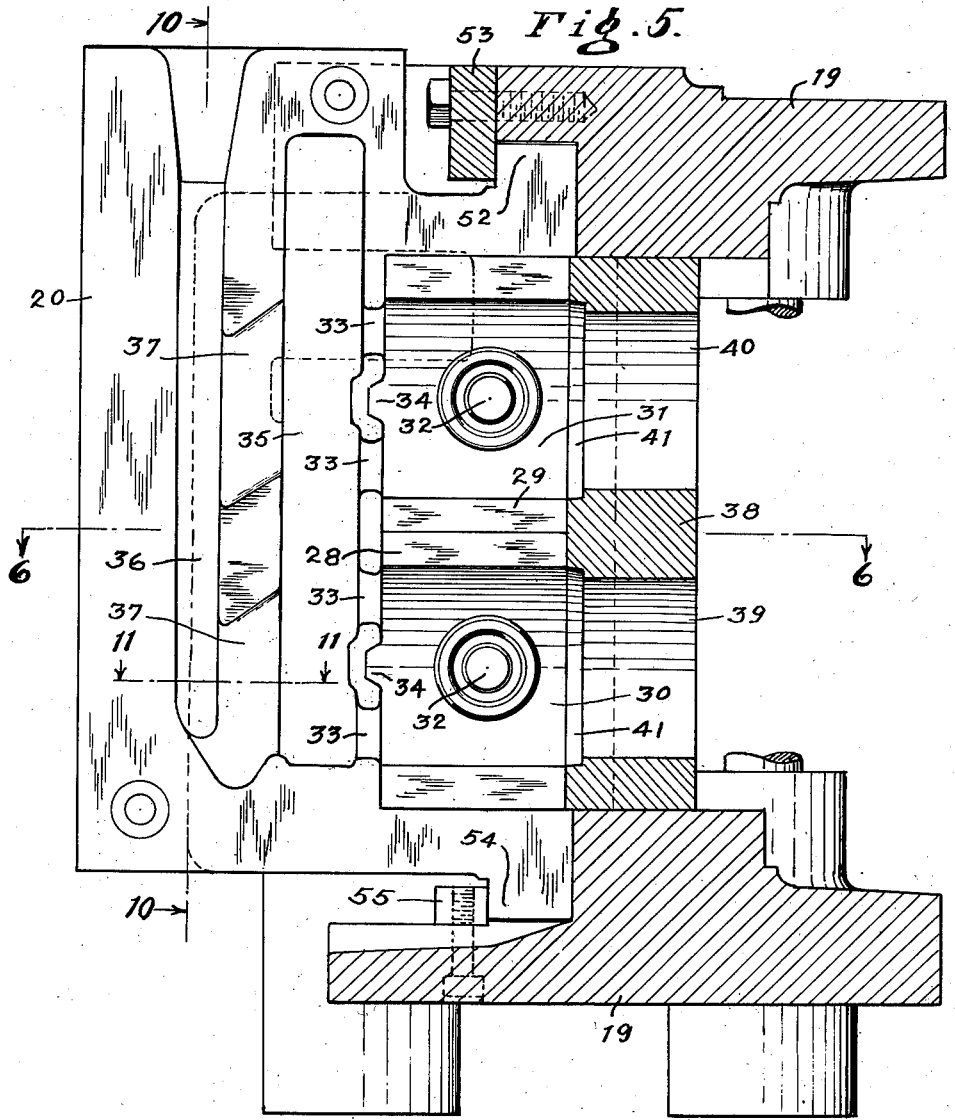
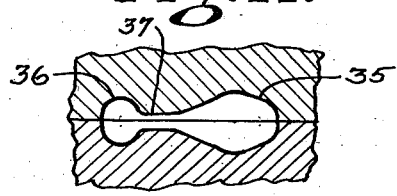
INVENTORS.
George C. Kohl.
Marius Guyot.
BY Richey & Watts
ATTORNEYS.

Sept. 2, 1941.  G. C. KOHL ET AL  2,254,295
MOLD
Filed Dec. 17, 1938  10 Sheets-Sheet 4
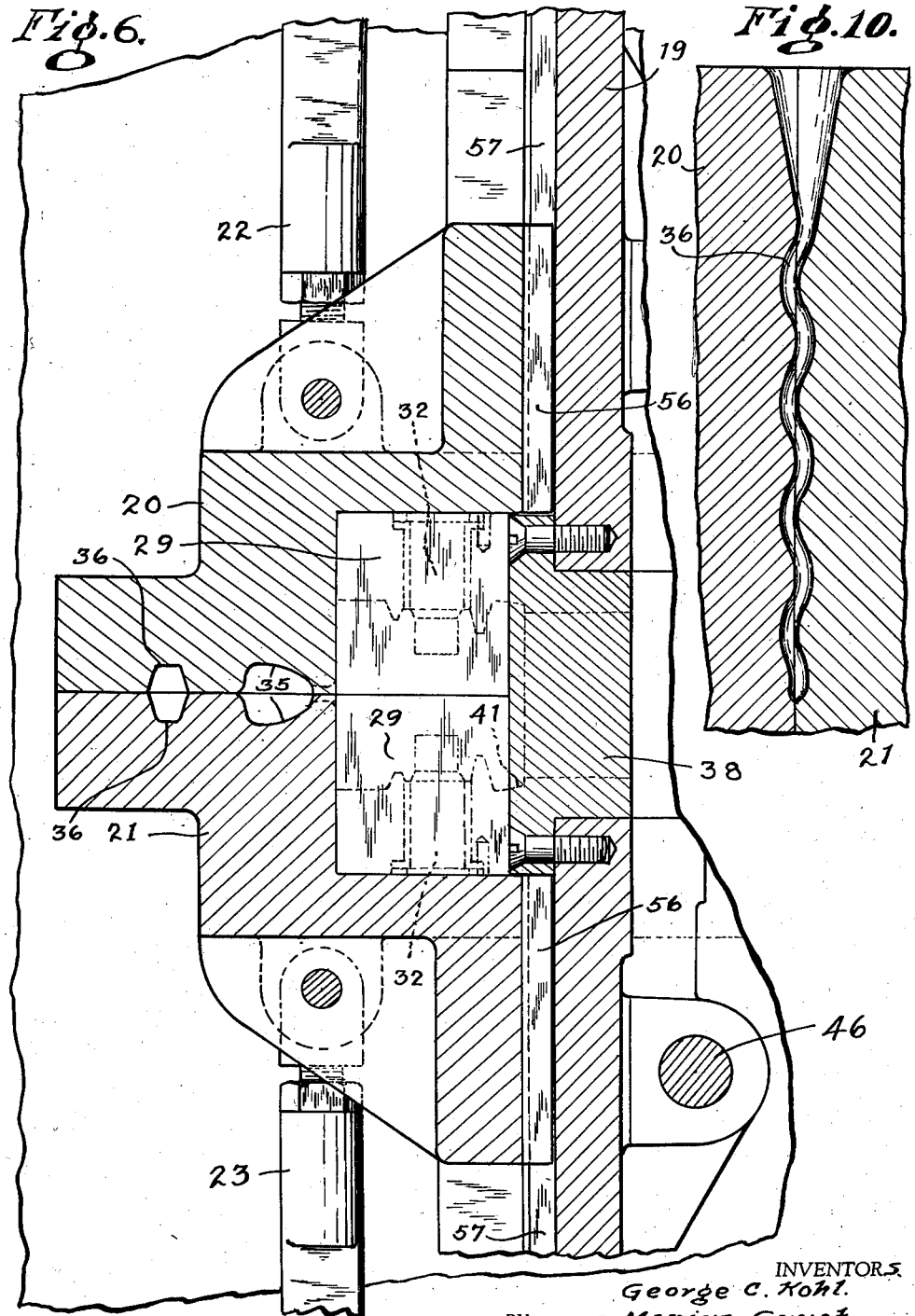
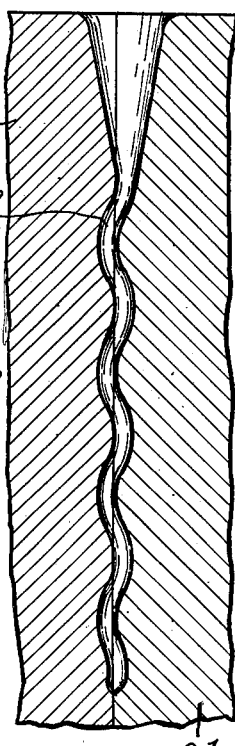
INVENTORS.
George C. Kohl.
Marius Guyot.
BY Richey & Watts
ATTORNEYS.

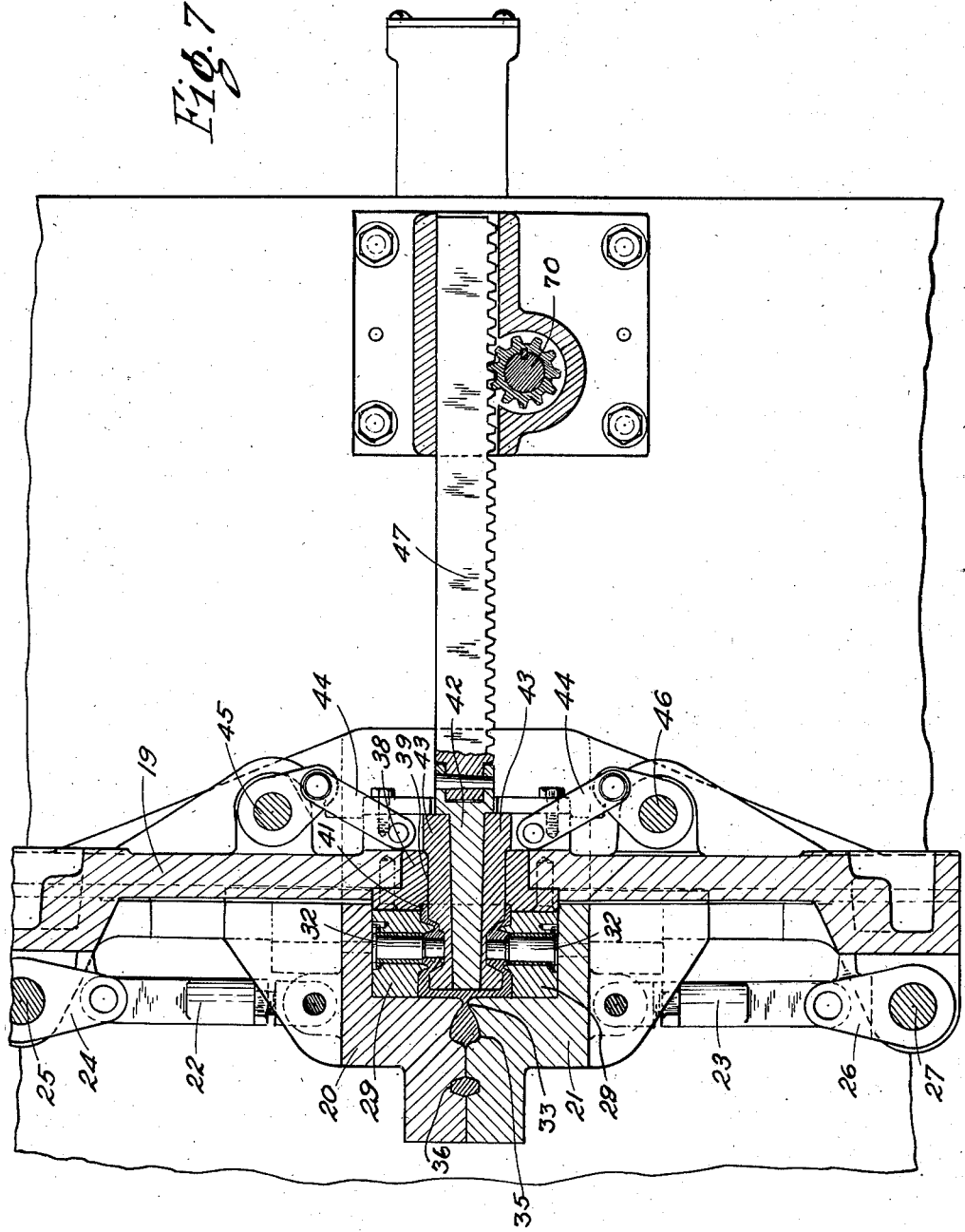

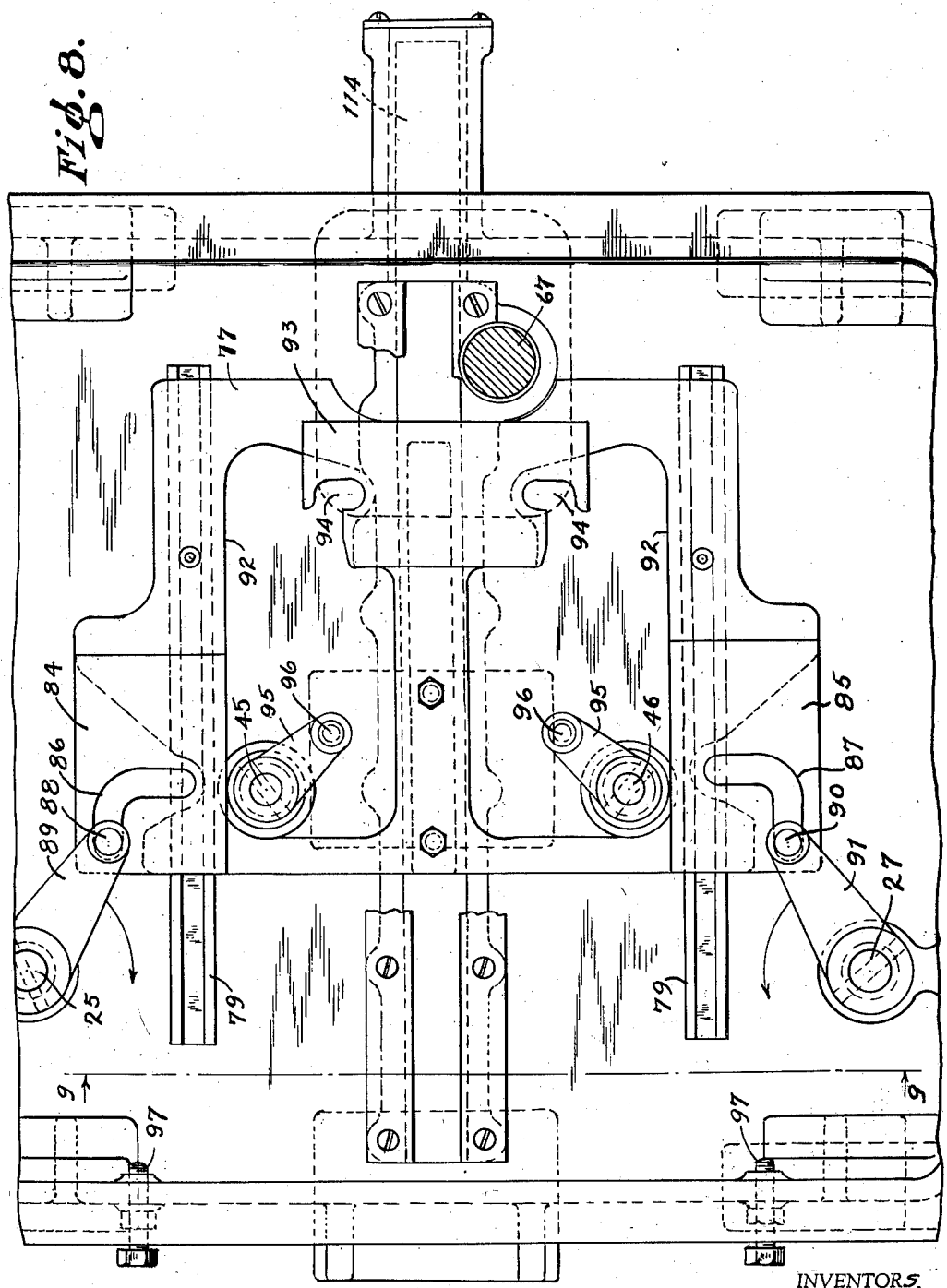

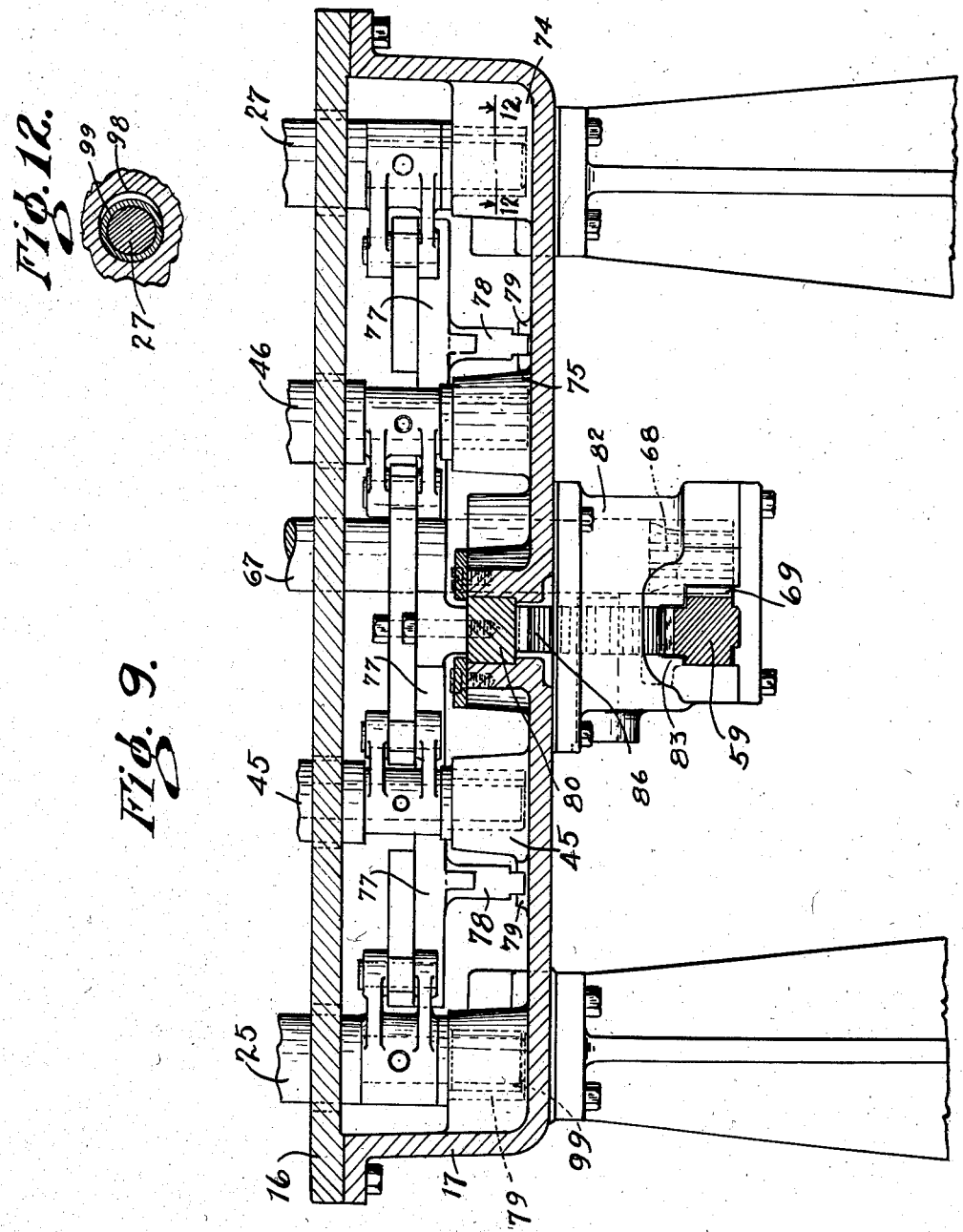

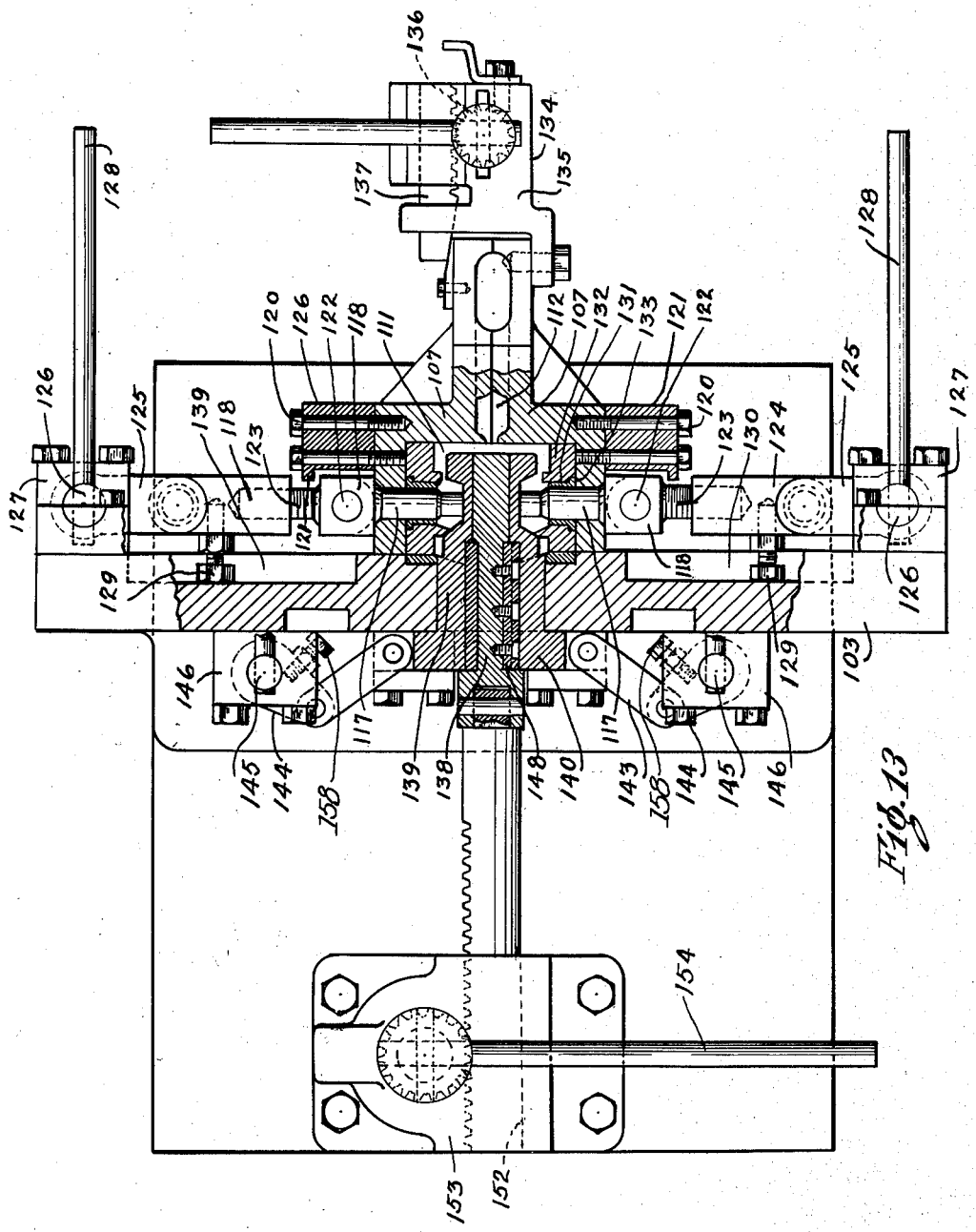

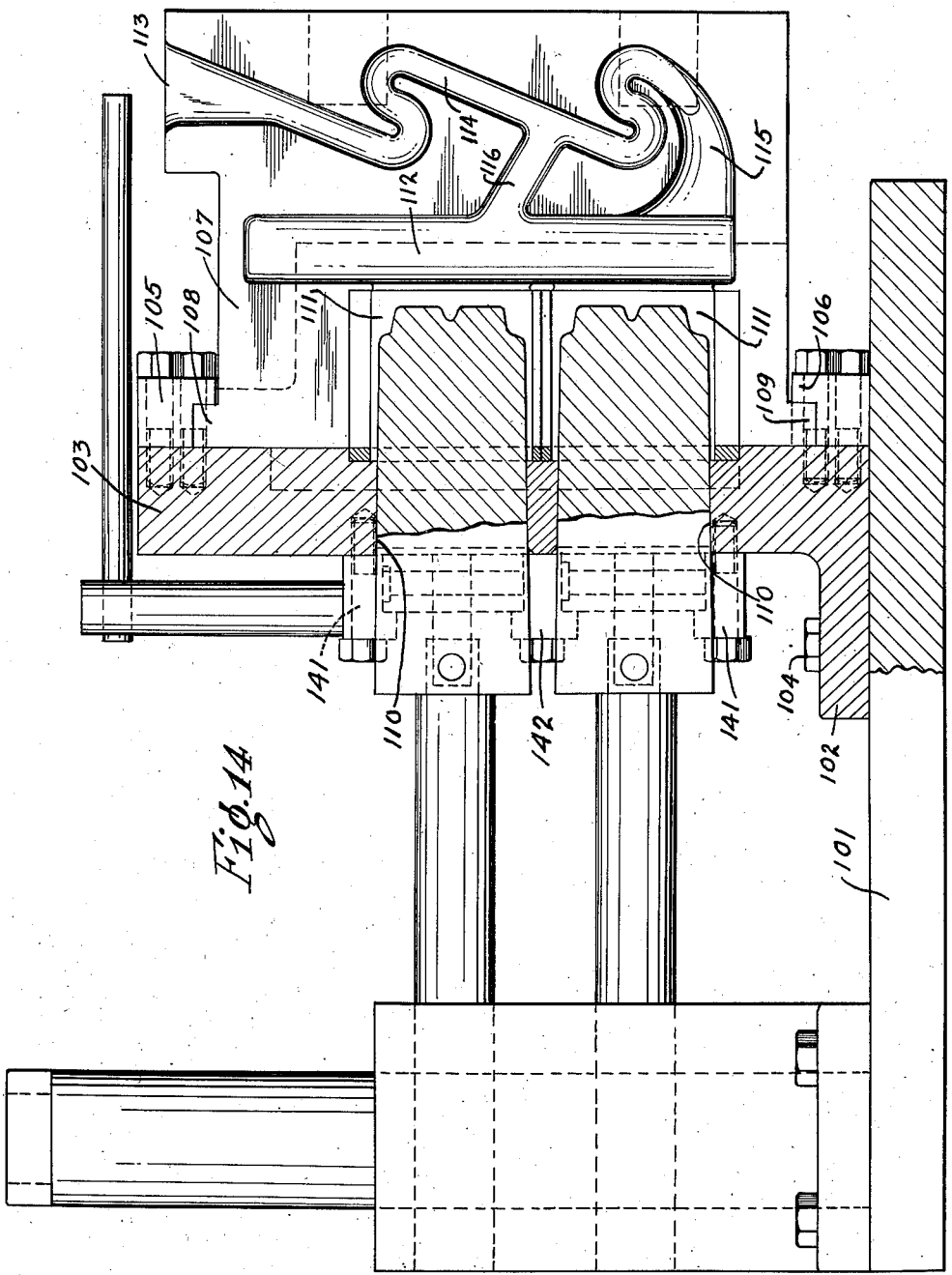

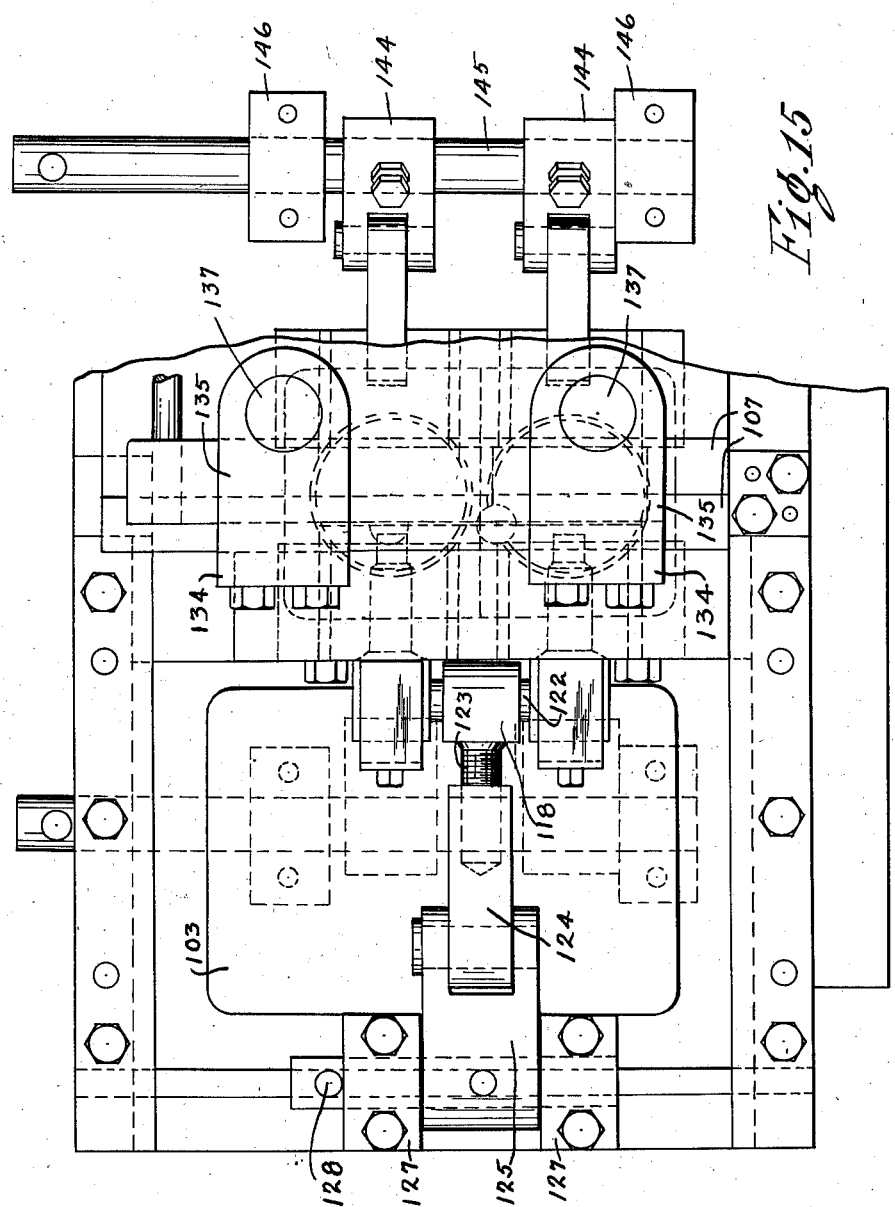

Patented Sept. 2, 1941

2,254,295

UNITED STATES PATENT OFFICE 2,254,295

MOLD

George C. Kohl and Marius Guyot, Cleveland, Ohio, assignors to Aluminum Company of America, Pittsburgh, Pa., a corporation of Pennsylvania Application December 17, 1938, Serial No. 246,442

33 Claims. (Cl. 22—149)

This invention relates to molds for casting pistons and the like and more particularly to permanent molds and mechanism for operating the same.

It has been the commercial practice heretofore to cast pistons for internal combustion engines and similar articles, from aluminum or other light metal alloys, in metal molds with multipart metal cores. In the prior commercial practice a casting cavity has commonly been formed in the meeting faces of a pair of mold halves so that the open end of the piston casting is uppermost. Gate and riser cavities have likewise been formed in the meeting faces of the mold halves arranged to initially introduce metal into the lower part of the casting cavity and to maintain molten metal at all times in communication with the portion of the metal which is freezing, so that the molten metal compensates for crystallization shrinkage in the casting without the formation of voids or porous structure in the casting. At the same time it has been customary to utilize an alloy proportioned to produce a relatively small amount of eutectic, and to maintain the temperature of the mold and core parts and the speed and direction of the flow of the metal into the casting cavity so correlated as to produce a fine grained chill cast structure with a network of eutectic substantially surrounding the excess substance of the alloy. This has required that the opening of the gate or feeder passage into the casting cavity be so proportioned as to obtain a smooth rapid flow of the metal into the casting cavity without splashing or inclusion of air or gas. The most successful prior commercial molds have embodied both a gate and a riser communicating with the lowermost portion of the casting cavity and opening into the casting cavity through relatively narrow openings throughout substantially the entire height of the cavity, with the axis of the piston being cast arranged vertically and the open end of the skirt uppermost.

Efforts have also been made in the past to produce aluminum alloy pistons having similar properties by arranging the casting cavity with the axis of the piston vertical, but with the head portion uppermost, and pouring the metal directly into the head portion. Pistons made in this way, however, have relatively coarse, porous, and weak head portions, and it has been necessary in pistons cast in molds of this type to increase the thickness of the head section in order to obtain the necessary strength with the undesirable metal structure existing in the head portion.

By the present invention we have provided a mold which may embody a plurality of casting cavities each of which will produce uniform accurate castings relatively free from porosity or the like, thereby greatly reducing the cost of the articles. The principal feature of our invention resides in the arrangement of a plurality of casting cavities in a single mold with their axes parallel, and with the axis of the gate and riser cavities crossing the axes of the casting cavities, so that the heat imparted to the mold is distributed relatively uniformly on each side of the axis of each casting cavity, thereby substantially preventing warping of the mold sections in one direction and at the same time substantially confining any warping that occurs in the other direction to the gate and riser portions of the mold so that the casting cavities are not affected.

We have also provided by the present invention an improved arrangement of either one casting cavity or a plurality of casting cavities and feeder cavities in which the axis of the casting cavity or cavities is arranged horizontally and the molten metal is fed by gravity to the cavity and enters first at the lowermost portion of the cavity and then rises to fill the same while molten metal is at all times retained in contact with the portion of the casting which is solidifying so as to compensate for crystallization shrinkage.

Other features of our invention are the arrangement of one or more casting cavities for pistons and the like, and feeder passages, so that the molten metal simultaneously fills the head portion and skirt portion cavities, flows laterally from the head portion to compensate for shrinkage in the skirt portion, while molten metal of the feeder flows laterally to compensate for crystallization shrinkage in the head portion.

Other features of this invention are to provide an improved mold and core supporting arrangement; to provide an improved arrangement of a multipart core facilitating the collapse of the core parts to permit removal of the casting from the mold; and a novel arrangement of the mold and core parts permitting rapid operation of the mold.

In the preferred embodiment of our invention we have provided a number of additional novel features which may be used with the features described above or may be used separately in other types of molds. The principal one of these is a novel construction and arrangement of gate or feeder for the mold which provides the necessary restriction to the fall of the metal, so that a smooth even flow is obtained, and at the same time greatly reduces the necessary area of the halves to accommodate the feeder, thereby reducing the effect which any warping of the mold halves may have upon the casting cavities. In addition the preferred embodiment of our invention includes a novel arrangement for manipulating the mold halves and core parts by power so as to greatly reduce the manual labor required to operate the mold. Other objects and advantages of the present invention will appear hereinafter.

This application is in part a continuation of our copending application Serial No. 22,998, filed May 23, 1935.

In the accompanying drawings:

Figure 1 is a front elevation of the preferred embodiment of our invention;

Figure 2 is a side elevation of the same;

Figure 2a is a detail sectional view taken on the line a—a of Figure 2;

Figure 5 is an elevation of one face of one of the mold halves, the base and supporting wall being shown in section;

Figure 6 is a sectional view taken on the line 6—6 of Figure 5;

Figure 7 is a horizontal section similar to Figure 4 but showing the mold closed;

Figure 8 is a top plan view of the operating mechanism for the mold with the mold itself removed; this view being taken substantially on the line 8—8 of Figure 2;

Figure 9 is a transverse section through the operating mechanism for the mold taken substantially on the planes indicated by the lines 9—9 of Figures 2 and 8;

Figure 10 is a section taken on the line 10—10 of Figure 5;

Figure 11 is a section taken on the line 11—11 of Figure 5;

Figure 12 is a section taken on the line 12—12 of Figure 9;

Figure 13 is a view partly in plan and partly in horizontal section showing a modified form of mold embodying our invention;

Figure 14 is a vertical section through the mold shown in Figure 13 showing one mold half in elevation;

Figure 15 is a front elevation of the mold shown in Figures 13 and 14 with parts broken away.

Figure 3:
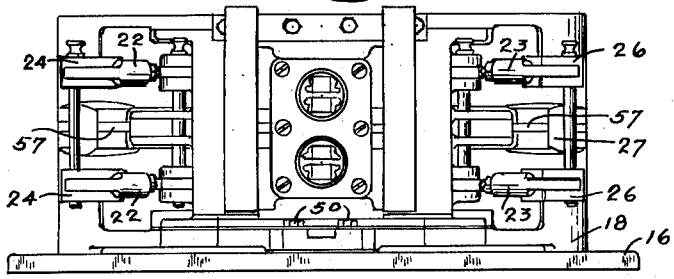
Figure 3 is a front elevation of the mold in opened position.

The preferred embodiment of our invention is shown in Figures 1 to 12, inclusive. In this embodiment the mold, including the mold base, movable mold halves and core parts, is mounted upon a table or supporting plate 16 which also carries a housing 17 enclosing the operating mechanism for the mold.

The mold base 18 supports a vertical mold wall 19 upon which are slidably mounted co-operating mold halves 20 and 21. The mold halves 20 and 21 are arranged to be reciprocated toward and away from each other on the vertical mold wall 19 by vertically spaced pairs of adjustable connecting rods 22 and 23, respectively. The two connecting rods 22 are pivoted to the mold half 20 and are pivotally joined to parallel cranks 24 secured to a vertical shaft 25. The connecting rods 23 are similarly pivotally connected to parallel cranks 26 secured to a vertical shaft 27.

The connecting rods 22 and cranks 24 act as toggle links when the cranks are turned into parallelism with the connecting rods in the position illustrated in Figure 7, as do the connecting rods 23 and cranks 26, and when in this position the two mold halves 20 and 21 are forced tightly against each other. When the shaft 25 is turned clockwise, and the shaft 27 is turned counter-clockwise, from the position shown in Figure 7 to the positions of Figure 4, the mold halves 20 and 21 are caused to slide away from each other along the supporting wall 19.

In the embodiment illustrated, and as shown in Figures 4 to 7 inclusive, each of the two mold halves 20 and 21 is provided with a recess receiving a pair of blocks 28 and 29, the two blocks 28 being recessed on their meeting faces to form a casting cavity 30 and the blocks 29 being similarly recessed to form a casting cavity 31 spaced vertically thereabove, the cavities 30 and 31 being arranged to form the exterior surfaces of pistons with their axes horizontal. The blocks 28 and 29 as shown are also provided with replaceable core pins 32 which are secured in position in the blocks to core out the openings in the wrist pin bosses of the pistons.

In front of the recesses receiving the blocks 28 and 29 the meeting faces of the mold halves are further recessed to provide a pair of vertically spaced relatively narrow gates 33 opening into each of the casting cavities. Within the space between each pair of gate recesses 33 the meeting faces of the mold halves may be provided with small recesses 34 opening into the center of each casting cavity and arranged to form a frusto-conical boss on the head of each piston casting. In front of the gate recesses 33 the meeting faces of the mold halves are recessed to provide a riser 35 which communicates with each of the gate openings 33 and extends from about the lower edge of the lower casting cavity 30 to any desired distance above the upper casting cavity 31. The meeting faces of the mold halves are further recessed to provide a sprue or feeder 36 and a pair of vertically spaced runners 37 extending upwardly from the sprue 36 to the riser 35 at points about opposite each of the two casting cavities.

The mating recesses forming the sprue 36 are each sinuous in form, or in other words, the base of each recess alternately rises up substantially flush with the face of the mold half in which it is formed and drops below such face. The alternate hills and valleys forming the base of the recess on one mold half are staggered with respect to those on the other mold half so that the sprue 36, as illustrated in Figure 10, is sinuous, but substantially uniform in depth.

Figure 4:
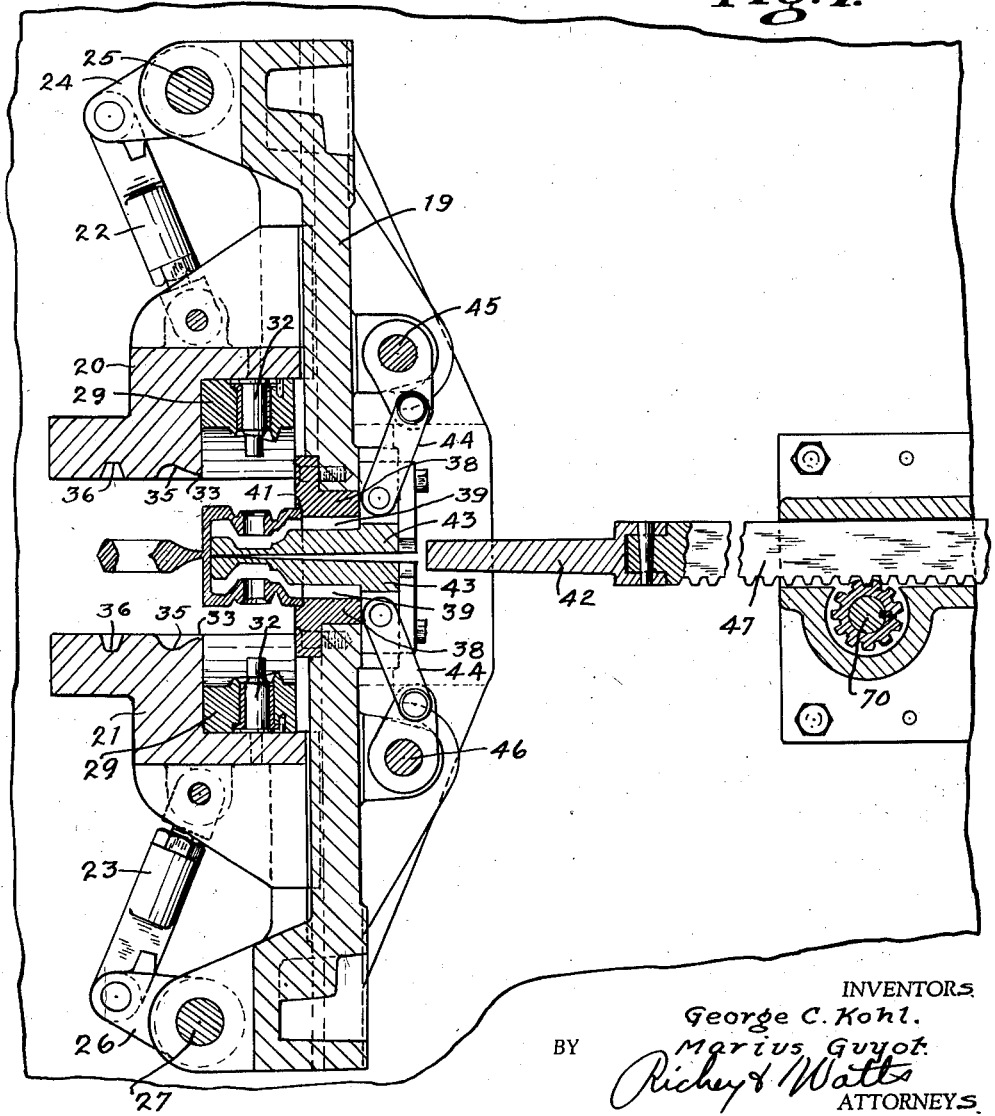
Figure 4 is a horizontal section through the axis of one of the casting cavities showing the mold open.

The vertical mold wall 19 is provided with an opening within which is secured a block 38 formed with apertures 39 and 40 aligned with the casting cavities 30 and 31, respectively. The block 38 is formed on its face adjacent the mold halves 20 and 21 with a countersink 41, surrounding each of the apertures 39 and 40, which forms the end wall and a portion of the side wall of the skirt portion of each casting cavity. The completed castings have the open ends of their skirts positioned in the countersinks 41, as illustrated in Figures 4 and 7, and thus the castings are supported in position on the vertical mold wall 19 when the mold halves 20 and 21 have been withdrawn.

Cores are arranged to extend through the mold support wall 19 to form the inner walls of the casting cavities. The cores are multipart, in this instance three part, and each comprises a central longitudinally movable part 42 and a pair of complementary laterally movable parts 43. The cores are collapsible by withdrawing the central core piece 42 axially of the casting through the open end and far enough to clear the side cores 43, after which the side cores 43 are moved together to clear the inwardly projecting parts of the piston casting, which can then be withdrawn axially. The side cores 43 are slidably mounted on the rear face of the vertical wall 19 and are arranged to be moved together after the withdrawal of the central cores 42 by means of links or connecting rods 44 pivoted to the side cores and at their opposite ends to crank arms carried by the shafts 45 and 46. Each of the central core pieces 42 is connected to the end of a horizontally movable rack, the upper rack being designated 47 and the lower 48.

The mold base 18 which may, if desired, be cast integral with the vertical mold wall 19, is bolted to the table or supporting plate 16 by bolts 50 located closely adjacent the plane defined by the meeting faces of the mold halves 20 and 21. At other points spaced laterally from the plane of the meeting faces of the mold halves the mold base 18 is provided with feet 51 which rest slidably upon the supporting table 16 so that the mold base 18 and mold wall 19 may expand and contract, from the heat to which these parts are subjected, independently of the supporting table 16, which remains at all times at a relatively low temperature.

Each of the mold halves 20 and 21 is provided with an upper flange 52 slidably held against the mold wall 19 by a retaining strip 53, a lower flange 54 held against the wall 19 by a retainer 55, and a centrally disposed tongue 56 fitting in a horizontal groove 57 formed in the wall 19. The tongues 56 fitting in the grooves 57 support the weight of the mold halves and locate the same vertically with respect to the wall 19, the retaining strips 53 and 55 merely holding the mold halves against the wall 19 and holding the tongues within the grooves. Sufficient clearance is provided at the upper edges of the flanges 52 and the lower edges of the flanges 54 to permit the mold halves to expand, when heated in both directions from the tongues 56. Thus the tendency of the mold halves to become misaligned vertically with respect to the openings 39 and 40 in the wall 19 from unequal heating of these parts is reduced to a minimum.

The mold is operated by power derived from any suitable source and in the embodiment shown a hydraulic cylinder 58 is secured below the housing 17 and encloses a suitable piston arranged to reciprocate a rack 59 when motive fluid is admitted to one end or the other of the cylinder 58. Motive fluid is admitted to, or exhausted from, one end of the cylinder through a pipe 60, and to the other end of the cylinder through a pipe 61, these pipes leading to a four-way valve 62 which is also connected to a pressure supply line 63 having an exhaust 64. The valve 62 has two extreme positions, in one of which pressure fluid is admitted to the front end of the cylinder and exhausted from the rear end, and in the other of which pressure is admitted to the rear end of the cylinder and exhausted from the front end. Thus by turning the handle of the valve 62 to one position the rack 59 is caused to move rearwardly to its extreme position and by turning the valve handle to the other position the rack 59 is caused to move forwardly to its other extreme position.

Behind the mold base 18 a pedestal 66 is secured to the supporting table 16 and provides a bearing for a vertically extending main shaft 67, and horizontal guides for the racks 47 and 48. The main shaft 67 extends downwardly through the supporting table 16 into the housing 17 and is provided at its lower end with gear teeth 68 meshing with the teeth 69 formed on one side of the rack bar 59. The shaft 67 is also provided with gear teeth meshing with the rack bar 48 connected to the lower of the two center core pieces 42 and also has a co-axial extension 70 provided with gear teeth meshing with the rack 47. The upper end of the main shaft 67 and the lower end of the extension shaft 70 are maintained in alignment by a coaxial pin 71 and are formed with inter-engaging shoulders 72 and 73 which permit limited relative rotation between the two shafts, after which one pair of the shoulders 72, 73 abut and compel the two shafts to rotate in unison.

It will be apparent that the shaft 67 will be caused to rotate when the rack bar 59 is moved, and will cause the rack 48 to move in unison with and in the same direction as the rack 59. After the shaft 67 has rotated a slight amount the shaft 70 will also be caused to rotate, so that the initial movement of the rack 59 in either direction will be accompanied by corresponding movement of the rack 48 and after a short interval by corresponding movement of the rack 47.

All of the moving parts carried on the mold proper, consisting of the two mold halves 20 and 21, and the four side cores 43, are controlled by the four vertical shafts 25, 27, 45, and 46. These shafts extend downwardly through the supporting table 16 and are journalled in bearings 74 and 75 carried by the housing 17. If desired, the four shafts 25, 27, 45, and 46 may be provided with separable joints at the supporting table 16 so that the entire mold can be lifted directly off the supporting table 16 by removing the bolts 50 without disturbing the operating mechanism contained within the housing 17. These joints may be constructed in any suitable way to permit longitudinal separation of the shafts while compelling the parts to rotate together when joined, as for example, by a joint such as illustrated in Figure 2a, except that no lost motion need be provided.

A cam plate 77 is positioned within the housing 17 and is provided with legs 78 slidably fitting in guideways 79 on the bottom of the housing 17 so that the cam plate 77 is slidable forwardly and rearwardly within the housing 17. A rack bar 80 secured to the underside of the cam plate 77 is in mesh with a gear 81 carried in a frame 82 below the housing 17 and meshing with rack teeth 83 formed on the upper surface of the rack bar 59.

At its opposite sides the cam plate 77 carries wings 84 and 85 provided with cam grooves 86 and 87, respectively. A pin 88 carried by the ends of parallel crank arms 89 secured to the shaft 25 slidably fits in the groove 86, and similarly a pin 90 carried by the ends of parallel crank arms 91 secured to the shaft 27 fits in the groove 87. The grooves 86 and 87 have portions parallel with the guides 79 connected by curves to portions extending substantially at right angles to the guides 79, as illustrated in Figure 8, so that the initial movement of the cam plate 77 to the left from the position shown in Figure 8 will not affect the positions of the cranks 89 and 91 until the pins 88 and 90 engage the curved portions of their respective grooves, and during the remainder of the movement of the plate 77 to the left the grooves 86 and 87 will cause the crank arms 89 and 91 to be moved through about 90°. Such movement of the crank arms 89 and 91 correspondingly rotates the shafts 25 and 27 and thereby pulls the mold halves 20 and 21 apart into their opened position.

The cam plate 77 is provided with two relatively large openings 92 within which are located the shafts 45 and 46 which are connected at their upper ends to the connecting rods 44 controlling the position of the side cores 43. Near the rear ends of these openings 92 a plate 93 is fastened to the plate 77 and is formed with open cam slots 94. Each of the shafts 45 and 46 is provided with a pair of parallel cranks 95 joined at their ends by pins 96, the latter being positioned when the mold is in closed position in alignment with, but spaced from, the cam slots 94 as illustrated in Figure 8. It will be apparent that when the plate 77 moves to the left from the position shown in Figure 8 the shafts 45 and 46 will not be moved until the cam slots 94 engage the pins 96, after which the cranks 95 will be swung to the left as seen in Figure 8, causing a corresponding rotation of the shafts 45 and 46 and forcing the side cores 43 together.

Preferably the cam groove 87 controlling the shaft 27 has a longer portion parallel with the guide ways 79 than has the groove 86, so that when the plate 77 is moved to the left from the position shown in Figure 8 the pin 88, and therefore the shaft 25, will be moved before the pin 90 reaches the curved part of the groove 86. Thereafter both the shafts 25 and 27 will be rotated in unison and in opposite directions.

The operation of the power mechanism for the mold is as follows: When the mold is in closed position with the mold halves clamped together and the cores in position within the casting cavities the parts are arranged as shown in Figures 6, 7 and 8 with the piston in the cylinder 94 at the forward limit of its movement and the cam plate 77 at the rearward limit of its movement as shown in Figure 8. When the handle of the valve 62 is turned to its opposite position pressure fluid is exhausted from the rear end of the cylinder 58 and is admitted to the forward end, causing the piston and the rack 59 to move rearwardly. Simultaneously with the movement of the rack 59, the rack 48 begins to move rearwardly, thereby breaking the lower central core piece from the casting and starting to move this core piece rearwardly. As soon as the lower central core piece has been broken free, the lost motion between the shafts 67 and 70 has been taken up and the rack 47 begins to move rearwardly, breaking the upper central core piece loose from its casting.

As the rack 59 begins to move rearwardly the gear 81 starts to move the cam plate 77 forwardly. This motion of the cam plate 77 is idle motion until the pin 88 engages the curved part of the slot 86, at which time both of the center core pieces have been broken free from their castings and are being withdrawn from between the side cores. As the pin 88 strikes the curved part of the slot 86, the shaft 25 begins to rotate in a clockwise direction, breaking free and withdrawing the mold half 20. Immediately thereafter, the pin 90 strikes the curved part of the slot 87, which starts to rotate the shaft 27 in a counterclockwise direction so that the mold half 21 is broken free from the castings and starts its withdrawal movement. The rack 59 then continues its rearward movement, continuing the rearward movement of the center core pieces from between the side core pieces and at the same time continuing the separation or withdrawal of the mold halves 20 and 21, until the pins 96 are engaged by the cam slots 94. At this time the center core pieces have been completely withdrawn from between the side cores. Further movement of the cam plate 77 to the left rocks the shafts 45 and 46 in opposite directions, causing the side cores 43 to be moved together within the openings 39 and 40 and within the castings which remain supported within the countersinks 41. The motion of the cam plate 77 to the left and the motion of the rack bar 59 to the right are stopped by the engagement of the forward end of the cam plate with adjustable abutments 97, which, as illustrated, may be bolts screwed through the housing 17.

The mold halves are then completely separated, the center cores withdrawn and the side cores collapsed together with the two castings supported in position upon the vertical mold wall 19. The castings are then removed in any convenient way, as by grasping them with tongs or the like. The two piston castings are connected together by the casting formed in the riser cavity 35 and the sprue cavity 36, and are separated and made ready for machining by trimming off the gate connections 33.

The mold is closed and the parts positioned for the next casting operation by turning the handle of the valve 62 to its opposite position. Motive fluid is thereby admitted to the rear end of the cylinder 58 causing the rack 59 and the racks 47 and 48 to move forwardly, and the cam plate 77 to move rearwardly. The movements previously described are then reversed, the cam slots 94 first swinging the shafts 45 and 46 so as to separate the side cores, the slots 86 and 87 then swinging the shafts 25 and 27 so that the mold halves are slid together, and the racks 47 and 48 finally forcing the center core pieces into position between the side cores in the casting cavities. The mold is then ready to receive molten metal to form castings.

The core pins 32 are adjusted in length so that they press firmly upon the side core pieces 43 when the mold is closed and the center core pieces 42 are in position. When held in this position the core pins prevent substantial separation or warping of the core pieces. The connecting rods 22 and 23 are adjusted in length so that when they are turned into alignment with the cranks 24 and 26 the two mold halves are pressed firmly together and locked against separation.

When the mold halves first close the center core pieces 42 are not yet fully advanced into position in the casting cavity, so that all of the force exerted by the connecting rods 22 and 23 acts to force the mold halves 20 and 21 together. The center core pieces, which are preferably wedge shaped, as illustrated in Figures 4 and 7, are then forced into position. The core pins 32 engaging the side core pieces 43 press the core parts firmly together, separation of the core pins or the mold halves during this operation being prevented by the connecting rods 22 and 23 and the cranks 24 and 26, which have been turned into alignment and are therefore locked against spreading movement of the mold halves.

When the mold is started in operation the parts are first heated to the desired operating temperature. Thereafter the excess heat imparted to the mold halves and cores by each casting operation is dissipated, either by simply permitting the mold to stand between pourings, or, as we prefer in order to increase the speed of operation, by circulating air or other cooling medium, through or around the mold halves and core pieces. We have found that the excessive heat may conveniently be dissipated at such a rate that the metal freezes in one mold while another mold is opened for the removal of the castings previously poured, and then closed and again poured. This operation ordinarily requires the application of a blast of air or other cooling medium during the relatively short period while the mold is open and the castings are being removed.

As previously stated, the mold proper and the core parts, because of their direct contact with the molten metal, reach a higher operating temperature than the supporting and operating parts. The mold base 18 is secured to the supporting table 18 only adjacent the center of the base, so that the entire mold may freely expand and contract with respect to the supporting table in both directions from the center. Similarly the mold halves may expand vertically in both directions from the central guiding tongues 56.

Provision is also made for the relative separation of the shafts 25, 45, 46 and 27 within the housing 17 resulting from the mold proper reaching a higher temperature than the operating mechanism. As illustrated in exaggerated form in Figures 9 and 12, the bearings 74 include oval apertures 98 receiving round bushings 99 within which the shafts 25 and 27 are journalled. The long axes of the oval apertures 98 are arranged parallel to the length of the vertical supporting wall 19 and the length of the base 18, so that as the mold base and the vertical supporting wall are heated up the bushings 99 may move laterally away from each other. The bearings for the shafts 45 and 46 are similarly arranged, although it will be understood that these shafts being closer to the center of the mold require less provision for lateral movement.

Another embodiment of our invention is illustrated in Figures 13, 14 and 15. This embodiment is similar to the one just described except that it is shown arranged for hand instead of power operation, embodies a different arrangement for moving the mold halves and core pins and a different gate and feeder arrangement, and includes a clamp for securing the front edges of the mold halves together.

As in the previously described embodiment, the structure shown in Figures 13, 14 and 15 embodies a supporting member 101, a mold base 102, and a vertical supporting wall 103.

The vertical supporting wall 103 and the base 102 may be secured to the supporting member 101 by cap screws 104 or other suitable means, and the vertical wall 103 is provided along the upper and lower edges of its forward or mold face with complementary horizontal guides 105 and 106. To support the mold on the wall 103 the two mold halves 107 are provided at their upper and lower edges with tongue portions 108 and 109 which have a free sliding fit in the slides 105 and 106, respectively. The mold support wall 103 is also provided with a pair of vertically aligned circular openings as at 110 to receive therein the core parts which form the inner wall of the casting cavity.

The meeting faces of the mold halves 107 are suitably recessed to provide a gate and casting cavities therebetween, there being in the mold illustrated two casting cavities 111 disposed one above the other and opening into a common riser cavity 112.

A compound gate serves to conduct the molten metal through the riser 112 to the casting cavities 111. Briefly the gate comprises an inlet passage 113, a smoothly curving sinuous control passage 114 which leads from the bottom of the inlet passage upwardly to form a trap, then downwardly to a second trap, and then through a shallow sweeping fan-shaped passage 115 into the vertical riser 112 common to both casting cavities. Above the fan-shaped passage 115 a second passage 116 is provided which extends upwardly from a junction with the passage 114 to enter the riser 112 opposite the lower edge of the upper casting cavity 111.

The shape of the passage 114, and the fan-shaped passage 115 co-operate to retard the velocity of the molten metal therethrough, so that the metal enters the casting cavities smoothly and at such a velocity that substantially all agitation or splashing of the metal is avoided. The traps provided by the upward curves in the passage assist in excluding light impurities from entry into the casting cavity. The auxiliary passage 116 provides a direct conduit for the molten metal that fills the upper casting cavity 111. Thus, although, the upper casting cavity is filled after the lower one in point of time, the condition of the molten metal is substantially the same at the time of filling, and uniformity of castings results.

Each casting cavity 111 is provided with core pins 117 which project thereinto to provide cored-out wrist pin bosses on the piston casting. The core pins 117 for each cavity are oppositely disposed and each terminates in an enlarged squared head 118. Shoulder blocks 119 are secured to the mold halves 107 by bolts 120, each block being positioned adjacent one of the core pin heads 118. Each block 119 is provided with a flange 121 projecting inwardly over the end of its adjacent core pin head. The flanges 121 are spaced laterally from the sides of the mold halves 107 a slightly greater distance than the lateral extent of the core pin heads 118, so that the core pins 117 are capable of limited lateral movement with respect to the mold halves 107, being limited in their movement by engagement with the flanges 121 and the mold halves 107.

The two vertically aligned core pin heads 118 on each side of the mold are connected together by a pin 122, to the central portion of which is pivoted an eye bolt 123. A pair of links 124 are adjustably threaded over the eye bolts 123 and have their opposite ends pivoted to cranks 125. The cranks 125 are carried by vertical shafts 126, which are rotatably mounted on the forward face of the wall 103 in suitable bearing brackets 127 and may be actuated by forwardly extending hand levers 128 at the upper end thereof.

The throw of the toggle link arrangement above described is limited with respect to the wall 103 by set screws 129 fixed to the links 124 and adjusted therein by lock nuts. The heads of the set screws 129 bear against the bottoms of grooves 130 formed in the wall 103. The effective length of the links 124 is adjustable by means of their threaded connections with the eye bolts 123.

When the parts are in the position shown in Figure 13 the two hand levers 128 may be simultaneously swung away from each other causing the cranks 125 to be turned and pulling outwardly upon the links 124 and the eye bolts 123 pivoted to the vertical pins 122. The four core pins 117 are thereby pulled outwardly until their squared heads 118 engage the flanges 121, after which continued movement of the hand levers separates the mold halves 107.

Means are provided within the mold halves 107 to support the core pins 117, comprising steel bushings 131 of about the same length as the thickness of the mold inserts 132, suitably flanged as at 133, and secured to the mold inserts 132 by contact with the wall of the mold.

The mold clamp 134 comprises a pair of apertured blocks 135 secured to and vertically spaced on the forward edge of one mold half 107. Each block 135 is provided with a vertically extending bore to receive a pinion shaft 136 and a horizontally extending bore to receive a rack 137. The racks 137 extend rearwardly from the blocks and are beveled to engage a wedge plate carried by the adjacent mold half 107. The pinion shaft 136 extends through both blocks and is rotated by a hand lever to actuate the racks 137 to clamp the mold halves together.

The cores which extend through the mold support wall 103 into the casting cavities 111 to form the inner walls of the casting cavities for the pistons are supported therein by means carried at the rear of the mold support wall 103. The cores are multipart, in this instance three parts, and comprise a central longitudinally movable part 138 and a pair of complementary laterally movable parts 139—139.

The laterally movable core parts 139 are each formed to provide a laterally extending flange portion 140 that bears against the rear face of the wall 103, and is mounted to slide thereon between parallel horizontal guideways 141 and 142 fixed thereto. A core actuating link 143 is pivoted at one end to the flange 140 of each core part 139 and at the other end to a crank 144 fixed to a vertically disposed shaft 145. Each shaft 145 is mounted for rotation in spaced bearings 146—146 fixed to the rear face of the wall 103, and carries a hand lever 147 at its upper end, which projects forwardly above the wall to a position where it may be actuated by the operator. The throw of each toggle link 143 is controlled by a set screw 158 carried on each crank 144 and bearing in a groove of the adjacent wall 103.

Each longitudinally movable core 138 is tapered in part and is arranged between the laterally movable parts 139 in operative position to wedge the parts 139 in place, as will be understood by those skilled in the art. The tapered parts of the core 138 are shown as provided with detachable plates 148 secured to the core by screws or other suitable means.

Each core 138 is moved rearwardly, out of its casting cavity 111 by a rack and pinion device mounted in the support 153 arranged at one end of the supporting member 101. A core shaft 149 is secured to each core 138 at one end, and is provided with a rack 150 at the other end, which engages a pinion 151 within the aperture 152 of the support 153. The hand lever 154 is carried by a shaft 155, rotatably mounted in the support 153, and serves to turn the pinion 151 on the shaft 155 to actuate the core part 138.

The operation of this embodiment of our invention is similar to the operation of the preferred embodiment except that the parts are shown arranged to be moved by hand levers instead of by power mechanism. In addition the core pins 117 are movable within the mold halves 107 and as previously explained the movement of the hand levers 122 first withdraws the core pins 117 slightly, after which further movement of the levers 122 separates the mold halves. When the mold is closed the levers 122 are moved toward each other causing the core pins 117 to be first projected into the mold halves, after which the squared heads 118 engage the sides of the mold halves and force the same together. When in closed position the squared heads 118 firmly press the mold halves 107 together in the region of the casting cavity and the ends of the core pins 117 firmly press against the sides of the side core members 139, holding the core members tightly assembled. In closed position the cranks 125 are turned into alignment with the links 124 as in the preferred embodiment and the mold halves and core parts are thereby firmly clamped together and locked against separating movement resulting from thermal expansion or any tendency of the parts to warp.

As in the preferred embodiment the completed castings are preferably supported, after separation of the mold halves and withdrawal of the cores, in countersinks or recesses 156 surrounding the openings in the vertical mold wall 103 through which the cores extend into the casting cavities.

It will be understood by those skilled in the art that the absence of gating projections on the thrust faces of the piston castings made in both embodiments of our invention is extremely desirable. In addition to affecting a considerable reduction in the cost of machining, the crystalline structure of the metal of the thrust faces is uniform throughout the extent of the thrust faces. In the pistons cast in molds of the prior art the thrust faces are cast integral with shrink pads or gates, and the thrust faces after machining present an area less dense, and characterized by coarser grain structure, than that part of the piston immediately adjacent the wall of the mold.

The use of a shrink pad or riser along the side walls of the piston cavities is obviated by the horizontal disposition of the piston cavity. Since the head of the piston is formed simultaneously with the side walls, and the molten metal in the piston cavity is caused to flow horizontally from the gate or riser uniformly throughout the cavity, a flow is obtained which prevents any turbulence or agitation during the pouring.

It is to be noted that the thin wall parts of the casting are remote from the gate and that as solidification progresses from the skirt portion to the head of the gate in the sequence named, the head acts as a riser to feed molten metal laterally into the skirt portions to compensate for shrinkage therein. Shrinkage in the head portion is compensated for by molten metal fed laterally into the head from the vertical riser 112.

In both forms of casting cavity and feeder arrangement disclosed, the portions of the mold halves containing the sprue and riser recess normally attain a higher temperature than the other parts of the mold because these portions remain in contact with molten metal through a longer period of time. The portions of the mold which form the head portions of the piston castings likewise attain a greater temperature than the portions forming the skirts of the piston castings, because the head portions include a greater volume of metal than do the skirt portions. In both forms illustrated the parts of the mold halves which attain the greatest temperature are evenly distributed on opposite sides of the axes of the casting cavities so that substantially no warping of the mold halves into curves lying in planes perpendicular to the axes of the casting cavities can occur in the region of the casting cavities. Any warping of the mold halves into curves lying in planes parallel to the axes of the casting cavities would result in separating the vertical edges of the meeting faces of the mold halves either adjacent the open end of the skirts of the piston castings or at the opposite side beyond the sprue cavities. In each embodiment the toggles pressing the mold halves together are arranged to exert their force in such a manner that the mold halves are held in close engagement through the region of the casting cavities, so that any separation in this direction occurs on the outer edge beyond the sprue cavity and can only result in forming a fin about the sprue or gate cavities without substantial distortion of the casting cavities.

In the sprue and riser construction illustrated in Figures 5, 10 and 11, it is possible to maintain the sprue much closer to the casting cavities while retaining the desired sinuosity of the sprue to insure an even and smooth flow of the metal than is the case with the sprue construction shown in Figure 14. As a consequence, with the sprue and riser construction shown in Figure 5, warping is even further reduced, since it is possible to reduce the length of the mold halves. This reduction in length causes all portions of the mold to obtain a more nearly uniform temperature and at the same time reduces the effect of any warping that does occur because of the reduced area of the meeting faces of the mold halves. It will be seen that for a given curvature induced by warping the separation of the mold halves at their edges is less for a small area than it is for a large area. It is, therefore, possible in the preferred form to dispense with any latch mechanism for the free edges of the mold halves adjacent the pouring sprue.

While two embodiments of our invention have been described in considerable detail, it will be understood that most of the features of our invention may be used in various other forms of molds. For example, the gating, the non-warping effects, and the novel arrangements of the casting cavities, gates and risers may be used in any type of mold, which may be operated in any desired way. Similarly the novel mechanical features may be used with differently shaped and constructed molding and feeder passages, and with different arrangements of the mold and cores. It is likewise to be understood that we are not limited to the particular shapes of the casting cavities disclosed. Many other variations and modifications may be made without departing from the scope of our invention as defined in the following claims.

We claim:

1. A permanent mold comprising a pair of co-operating mold halves recessed on their meeting faces to form a plurality of substantially cylindrical piston casting cavities with their axes horizontal and a feeder passage opening through the upper edges of said mold halves and extending downwardly across the axes of all of said casting cavities and opening into one end of each of said casting cavities, and movable core means extending into each of said cavities from the opposite end.

2. A permanent mold comprising a pair of mold halves having their meeting faces arranged in a vertical plane and recessed to form a plurality of piston casting cavities arranged in vertical alignment with their axes horizontal and a feeder passage opening through the upper edges of said mold halves and extending downwardly across the axes of all of said casting cavities and opening into all of said casting cavities from one end, and movable core means extending into said cavities from the opposite end.

3. A permanent mold comprising a pair of mold halves having their meeting faces arranged in a vertical plane and recessed to form a substantially cylindrical piston casting cavity with its axis arranged horizontally, and a feeder passage opening through the upper edges of said mold halves and extending downwardly past one end of said casting cavity and across the axis thereof and arranged to heat said mold halves in the region of said feeder passage substantially uniformly both above and below the axis of said casting cavity, and a gate opening laterally from said passage into both the uppermost and lowermost portions of the adjacent end of said casting cavity.

4. A permanent mold comprising a pair of mold halves having their meeting faces arranged in a vertical plane and recessed to form a pair of substantially cylindrical casting cavities arranged in vertical alignment with their axes horizontal, and a feeder passage opening through the upper edges of said mold halves and extending downwardly past one end of said casting cavities and past the axes of both of said casting cavities and gates opening laterally from said feeder passage into the adjacent ends of said casting cavities at both the uppermost and lowermost portions of each of said casting cavities said passage and gates being so proportioned that molten metal poured into said feeder passage will first fill the lowermost casting cavity and thereafter fill the upper casting cavity.

5. A permanent mold comprising a mold support, complementary mold parts movable thereon, said mold parts recessed to form a plurality of piston casting cavities with the piston axes extending horizontally, a common riser communicating with said casting cavities, a common inlet cavity and a plurality of lead-in cavities each communicating with said inlet cavity and with said riser cavity.

6. A permanent mold comprising a mold support, complementary mold parts movable thereon and having meeting faces arranged in a vertical plane, said mold parts recessed to form a plurality of piston casting cavities with the piston axes extending horizontally, a common riser extending vertically and communicating with said casting cavities, a common inlet cavity extending vertically and a plurality of lead-in cavities each communicating laterally with said inlet cavity and said riser cavity.

7. A permanent mold comprising a base, a vertically extending mold wall thereon, a pair of complementary mold sections slidably mounted on said mold wall, each of said sections provided with cavities co-operating to form a plurality of cup-like casting cavities, a riser cavity communicating with a casting cavity and an inlet cavity leading to said riser cavity.

8. A permanent mold comprising a base, a vertically extending mold wall mounted thereon, horizontally extending guide means arranged adjacent the upper and lower edges of said mold wall, a pair of complementary mold sections, means on said mold sections co-operating with said guide means to slidably support said mold sections on said mold wall, each of said mold sections having a pair of casting cavities arranged one above the other and complementary recesses forming a vertical riser common to said casting cavities and an inlet cavity formed in said mold sections having a pair of outlets spaced vertically with respect to each other leading into said common riser.

9. A permanent mold comprising a base portion, a vertically extending mold wall secured thereto, a pair of complementary mold sections, means on one face of said mold wall to slidably support said mold sections, said mold wall having a pair of vertically spaced apertures and a pair of core members arranged within said apertures and proportioned to extend beyond that face of the mold wall provided with the mold sections.

10. A permanent mold comprising a base portion, a vertically extending mold wall secured thereto, a pair of complementary mold sections movably mounted on one face of said mold wall, said mold wall having a pair of vertically spaced apertures, a pair of core members arranged in said apertures and proportioned to extend beyond that face of the mold wall provided with the mold sections and means to reciprocate said core members to position the same prior to and subsequent to a casting operation.

11. A permanent mold comprising a base, complementary mold halves mounted for horizontal movement with respect to said base, each of said mold halves having cavities formed therein, said cavities extending to the edge of said mold halves, a vertically extending support, and a multipart core extending horizontally into each of said cavities and through said support, each of said cores defining the interior surfaces of the article to be formed in its cavity.

12. A permanent mold comprising a base, complementary mold halves mounted for horizontal movement with respect to said base, each of said mold halves having a plurality of generally semi-cylindrical cavities having the axis of the cylindrical cavities formed by said mold halves extending horizontally, a vertically extending support, a plurality of horizontally movable core members adapted to be arranged within said cylindrical cavities to define the interior surfaces of the article being cast, and means carried by said vertically extending support connected to said core members to move said core members with respect to said cavities.

13. A permanent mold comprising a base, a vertically extending support thereon, a pair of mold halves mounted to reciprocate horizontally with respect to said base, means to move said mold halves toward and away from each other, each of said mold halves having a plurality of horizontally extending piston casting cavities formed therein with an open end of said casting cavities arranged in abutment with said vertically extending support, a multipart core arranged within each of said casting cavities, said multipart core comprising a central core member and a pair of cooperating side core members, co-operating means on said support and said side core members to guide said side core members for movement toward and away from each other.

14. A permanent mold comprising a base portion, a vertically extending mold wall, a pair of complementary mold sections, means to slidably mount said sections on one face of said mold wall, each of said mold sections having a pair of vertically spaced semi-cylindrical casting cavities and a common inlet and riser cavity, said riser cavity leading to said casting cavities, said mold wall having a pair of spaced cylindrical apertures arranged co-axially of said casting cavities, a pair of core members, means to reciprocate said core members with respect to said mold wall and said casting cavities in the direction of the longitudinal axis of said casting cavities, additional core members arranged to co-operate therewith and means to reciprocate said last named core members laterally with respect to said longitudinal axis whereby the casting formed by said cores and casting cavities may be freed from said core members.

15. A permanent mold comprising a base portion having a vertically extending mold wall, a pair of complementary mold sections mounted on said wall for movement with respect to each other, each of said mold sections having semi-cylindrical cavities therein to form the outer wall of a piston, said casting cavities having one end thereof open to said vertical wall, said wall having an aperture with the axis thereof coincident with the longitudinal axis of the piston cavity, a multipart core extending through said aperture and projecting within said piston casting cavity, means to guide a part of said core in the direction of said axis to free the same of a piston casting and means to guide another part of said core transversely with respect to the movement of said first named core part.

16. A permanent mold for casting pistons comprising a pair of complementary mold halves with a parting plane between the mold halves extending vertically, each of said mold halves having opposed complementary recesses opening to said parting plane, one of said recesses providing a horizontally extending semi-cylindrical casting cavity for one half of a piston, a second of said recesses providing one half of a narrow gate cavity co-extensive vertically with the piston casting and joined thereto in the piston head forming portion thereof whereby crystallization shrinkage in the head of the piston may be accommodated by horizontal flow of molten metal in the gate, another of said recesses providing one half of a sprue cavity to lead the molten metal to said gate and a multipart core arranged within said piston casting cavity.

17. A permanent mold for pistons comprising a vertically extending wall having an aperture therethrough, piston core parts movable with respect to said wall supported and guided in said aperture, a pair of mold halves separated from each other on a vertical plane, each of said mold halves having complementary semi-cylindrical recesses therein to provide a horizontally extending piston casting cavity arranged in alignment with said wall aperture whereby said wall and said mold halves co-operate to form the outer surface of the piston, means to move said mold halves with respect to each other and with respect to said wall and means to move said core parts with respect to said wall.

18. A permanent mold comprising a base, a pair of complementary mold halves mounted to reciprocate with respect to each other on said base, each of said mold halves provided with a plurality of horizontally extending semi-cylindrical piston casting cavities formed therein, each of said casting cavities being continuous to an outer face of the mold halves, a plurality of central core members, means to move said core members horizontally in and out of said piston casting cavities, a plurality of side core members arranged within said piston casting cavities and means to move said side core members laterally.

19. A permanent mold comprising a base, a vertical mold wall thereon, two mold halves movably mounted on said wall, each mold half having a plurality of semi-cylindrical casting cavities, a plurality of core pins supported in each mold half and means to simultaneously move said pins with respect to said mold half and move one mold half with respect to the other.

20. A permanent mold comprising a supporting member, complementary mold parts movable thereon and formed with recesses defining a casting cavity, a sectional core arranged to be positioned within said casting cavity, core pins reciprocable through openings in said mold halves and arranged to project within said casting cavity and abut said sectional core, and toggle means for operating said core pins arranged to lock said core pins in clamped relation against said sectional core.

21. A permanent mold comprising a supporting member, complementary mold parts movable thereon and formed with recesses defining a casting cavity, a sectional core arranged to be positioned within said casting cavity, core pins reciprocable through openings in said mold halves and arranged to project within said casting cavity and abut said sectional core, said pins having shoulders arranged to abut said mold halves, and toggle means for operating said core pins arranged to lock said core pins in clamped relation against said sectional core and said mold halves.

22. A permanent mold comprising a supporting member, complementary mold halves movable toward and away from each other on said supporting member and being formed with recesses defining a casting cavity, core means supported by and projecting through said supporting member and extending into said casting cavity, core pins reciprocable through said mold halves and arranged to be projected into said casting cavity, means for reciprocating said core pins and lost motion abutments on each of said core pins and the mold half through which it extends, whereby during the initial operation of said means for reciprocating said core pins said core pins are moved independently of said mold halves and during the remainder of such operation said core pins and mold halves are moved together.

23. In a permanent mold, a pair of mold members having their meeting faces arranged in a substantially vertical plane, said mold parts having their meeting faces formed with mating recesses undulating in depth forming a sinuous feeder passage substantially uniform in depth.

24. In a permanent mold, a pair of mold parts having meeting faces recessed to form a feeder passage, each of said recesses consisting of alternate deep and shallow portions, the deep and shallow portions of the recess in one of said mold parts being disposed opposite the shallow and deep portions, respectively, of the recess in the other mold part.

25. A permanent mold comprising a pair of mold halves having their meeting faces recessed to form a casting cavity and a feeder passage communicating with said casting cavity, each of the recesses forming said feeder passage undulating in depth, the alternate hills and valleys forming the base of the recess in one mold half being staggered with respect to those in the other mold half.

26. A permanent mold comprising a pair of mold halves having meeting faces arranged in a vertical plane and recessed to form a casting cavity and a feeder passage, the edges of the recesses forming said feeder passage being substantially vertical and the bottoms thereof undulating in depth with the undulations of the recess formed in one mold half staggered with respect to those of the recess in the other mold half, so that said feeder passage is sinuous in a vertical plane perpendicular to the meeting faces of said mold halves.

27. A permanent mold comprising a pair of mold halves having their meeting faces arranged in a substantially vertical plane and recessed to form a pair of casting cavities with their axes horizontal and a feeder passage, the edges of the recesses forming the feeder passage being vertical and the bottoms thereof undulating in depth with the undulations of the recess formed in one mold half staggered with respect to those of the recess in the other mold half, so that said feeder passage is sinuous in a vertical plane perpendicular to the meeting faces of said mold halves.

28. A permanent mold comprising complementary mold halves recessed to form a piston casting cavity, a multipart core arranged within said piston casting cavity comprising a central core piece supported for axial movement into and out of said cavity and a pair of side core pieces supported and guided for substantially straight line sliding movement toward and away from each other, and power means to move said central core members axially out of said casting cavity and means to move said side core pieces simultaneously towards each other after the withdrawal of said central core piece.

29. A permanent mold comprising a pair of mold halves recessed to form a casting cavity and movable toward and away from each other, a multipart core comprising a central core piece and side core pieces guided for substantially straight line movement, and power means for operating said mold arranged to move first said central core piece outwardly, then separate said mold halves while continuing to move said central core piece axially out of said casting cavity, and means to move said side core pieces simultaneously toward each other after the withdrawal of said central core piece.

30. A permanent mold comprising a supporting member, a pair of mold halves slidably mounted on said supporting member, a pair of spaced shafts journalled on one side of said supporting member and having cranks connected by pivoted links to said mold halves, each of said mold halves being recessed to form a casting cavity, core pieces guided for substantially straight line movement toward and away from each other positioned within said casting cavity and a second pair of shafts journalled on the opposite side of said supporting member and having cranks connected by pivoted links to said core pieces.

31. A permanent mold comprising a supporting member, a pair of mold halves slidably mounted on said supporting member, a pair of spaced shafts journalled on one side of said supporting member and having cranks connected by pivoted links to said mold halves, each of said mold halves being recessed to form a casting cavity, core pieces movable toward and away from each other positioned within said casting cavity and a second pair of shafts journalled on the opposite side of said supporting member and having cranks connected by pivoted links to said core pieces, a reciprocable member having means associated with each of said shafts to partially rotate the same, and means to reciprocate said member.

32. A permanent mold comprising a supporting member having spaced apertures therein, a pair of mold halves slidably mounted on said supporting member and having their meeting faces recessed to form a pair of casting cavities aligned with the apertures in said supporting member when said mold halves are closed, an interfitting guiding and positioning means on said mold halves and said supporting member arranged on a line passing between the apertures in said supporting member.

33. A permanent mold comprising a housing, mold operating mechanism within said housing, a supporting member carrying movable mold sections and core parts carried by said housing, rotatable shafts for operating said mold sections and core parts carried by said supporting member and extending into said housing and operatively associated with said mold operating mechanism, and journals for said shafts within said housing movable toward and away from each other to accommodate unequal expansion of said housing and said supporting member, said journals being restrained against movement in other directions with respect to said housing.

GEORGE C. KOHL.
MARIUS GUYOT.